W. BUNDY.
Hoes.

No. 205,472. Patented July 2, 1878.

WITNESSES.
Wm E Moore
W K Bellis

INVENTOR.
Wm Bundy,
PER C. Bradford
ATTORNEY.

N. PETERS, PHOTO-LITHOGRAPHER, WASHINGTON, D. C.

UNITED STATES PATENT OFFICE.

WILLIAM BUNDY, OF CARTHAGE, INDIANA.

IMPROVEMENT IN HOES.

Specification forming part of Letters Patent No. 205,472, dated July 2, 1878; application filed May 13, 1878.

*To all whom it may concern:*

Be it known that I, WILLIAM BUNDY, of the town of Carthage, county of Rush and State of Indiana, have invented certain new and useful Improvements in Hoes, of which the following is a specification:

Reference is had to the accompanying drawings, which are made a part hereof, and on which similar letters of reference indicate similar parts.

Figure 1:
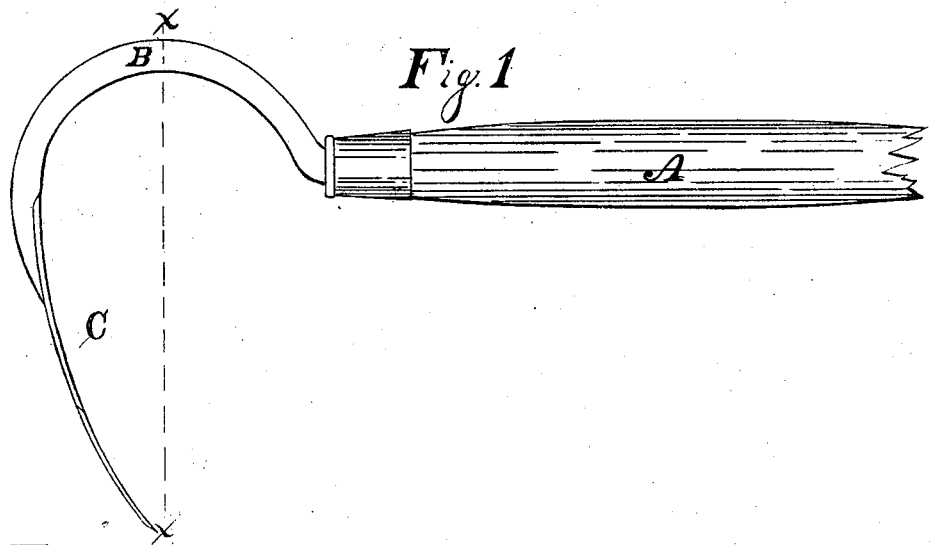
Figure 2:
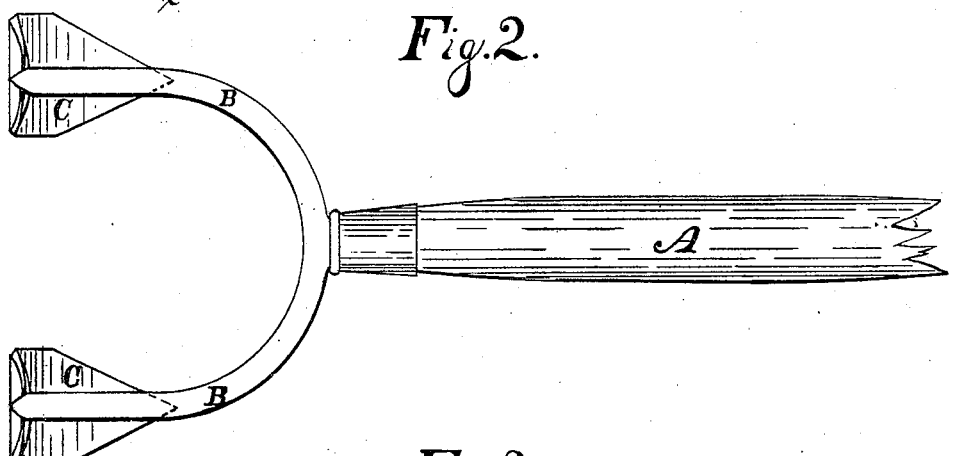
Figure 3:
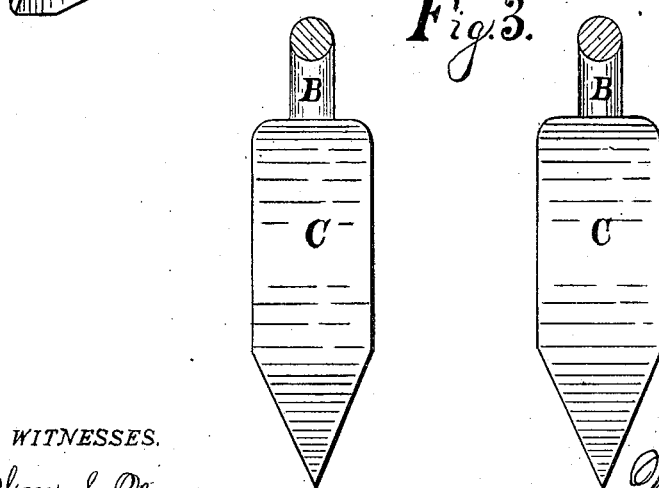

Figure 1 is a side elevation of my improved hoe. Fig. 2 is a top or plan view thereof; and Fig. 3 is a front view of the blades as seen from the dotted lines x x.

In said drawings, the portions marked A represent the lower end of an ordinary hoe-handle; B B, curved shanks, to which the blades are attached, and C C the blades of the hoe.

The object of my invention is to produce a hoe with which the ground can be more thoroughly and easily pulverized, and which can be operated with less fatigue to the user than the hoes ordinarily used.

To accomplish this object I take the two blades C C and mount them on the shanks B B, preferably by welding. These shanks are arched upwardly, so as to avoid any such contact with the earth or weeds as would cause them to become clogged, and at the same time allow the point of juncture with the handle to be as low as the top of the hoe-blades, which is important to the easy handling of the implement. They are also bowed as well as arched, so as to keep the blades at the proper distance apart.

I am aware that the arching and spreading of the shanks of such hoes is not in itself new; but none have heretofore been covered in both ways in that regular even manner illustrated in my invention, and which subserves an important purpose in making the implement strong and useful without a too great weight and size of the material of which they are composed.

I prefer to construct the blades of this hoe of steel, the shanks of wrought or malleable iron, and to use the ordinary wooden handle, though of course any suitable material may be used. I also prefer to have the blades curved somewhat, as shown in Fig. 1.

Having thus fully described my said invention, what I claim as new, and desire to secure by Letters Patent, is—

A hoe composed of the handle A, the shanks B B, each arched and bowed in the manner shown, and the hooked and pointed blades C C, all substantially as described, and for the purpose specified.

In witness whereof I have hereunto set my hand and seal at Indianapolis, Indiana, this 8th day of May, A. D. 1878.

WILLIAM BUNDY. [L. S.]

In presence of—
C. BRADFORD,
WM. E. MOORE.